US012459099B2

(12) United States Patent
Wang

(10) Patent No.: US 12,459,099 B2
(45) Date of Patent: Nov. 4, 2025

(54) PNEUMATIC CHIPPING HAMMER

(71) Applicants: HANGZHOU UNITED TOOLS CO., LTD., Hangzhou (CN); HANGZHOU GREAT STAR INDUSTRIAL CO., LTD., Hangzhou (CN)

(72) Inventor: Weiyi Wang, Hangzhou (CN)

(73) Assignees: HANGZHOU UNITED TOOLS CO., LTD. (CN); HANGZHOU GREAT STAR INDUSTRIAL CO., LTD. (CN)

( * ) Notice: Subject to any disclaimer, the term of this patent is extended or adjusted under 35 U.S.C. 154(b) by 828 days.

(21) Appl. No.: 17/680,845

(22) PCT Filed: Aug. 29, 2019

(86) PCT No.: PCT/CN2019/103364
§ 371 (c)(1),
(2) Date: Feb. 25, 2022

(87) PCT Pub. No.: WO2021/035630
PCT Pub. Date: Mar. 4, 2021

(65) Prior Publication Data
US 2022/0402108 A1 Dec. 22, 2022

(51) Int. Cl.
*B25D 9/00* (2006.01)
*B25D 17/04* (2006.01)
*B25D 17/08* (2006.01)

(52) U.S. Cl.
CPC ............... *B25D 9/00* (2013.01); *B25D 17/04* (2013.01); *B25D 17/08* (2013.01)

(58) Field of Classification Search
None
See application file for complete search history.

(56) References Cited

U.S. PATENT DOCUMENTS 530,989 A * 12/1894 Gist .................... B23Q 11/0046 173/75
1,855,805 A * 4/1932 Luxmore ................. B25D 9/10 173/209

(Continued)

FOREIGN PATENT DOCUMENTS

CN 1358412 A 7/2002
CN 202273392 U 6/2012

(Continued)

OTHER PUBLICATIONS

International Search Report and Written Opinion, PCT Application No. PCT/CN2019/103364, Apr. 6, 2020, 9 pages (English Translation of ISR pp. 1-2), CNIPA.

(Continued)

*Primary Examiner* — Tanzim Imam
(74) *Attorney, Agent, or Firm* — Jaffery Watson Hamilton & DeSanctis LLP

(57) ABSTRACT

The present application discloses a pneumatic chipping hammer, and relates to a pneumatic impact tool, which comprises a handle part, the handle part being a hollow member; a main power part, one end of the main power part being connected to the handle part, and principal axes of the handle part and the main power part forming a certain angle; and a chisel part, the chisel part being detachably connected to the other end of the main power part, wherein the direction of mounting the chisel part on the main power part can be changed. According to the pneumatic chipping hammer of the present application, the mounting direction of the chisel part on the main power part is changed by the locking member, and therefore the angle between the principal axes of the handle part and the main power part can be 5-85 degrees, so that a handle is inclined to further achieve (Continued)

different purposes and be suitable for people with different heights.

16 Claims, 7 Drawing Sheets

(56) References Cited

U.S. PATENT DOCUMENTS

| | | | | | |
|---|---|---|---|---|---|
| 4,852,661 | A * | 8/1989 | Ellington | E04G 23/08 173/84 |
| 2002/0134562 | A1 * | 9/2002 | Paul | B25D 9/04 173/114 |
| 2003/0075347 | A1 * | 4/2003 | Hanke | B25D 17/088 173/48 |
| 2010/0059949 | A1 * | 3/2010 | Kennard | B25D 17/043 280/47.21 |
| 2012/0167322 | A1 | 7/2012 | Jaworski et al. | |
| 2017/0106519 | A1 * | 4/2017 | Hsieh | B25D 17/245 |
| 2017/0291291 | A1 * | 10/2017 | Chen | B25F 5/02 |
| 2018/0085907 | A1 * | 3/2018 | Wilson | B62B 5/065 |
| 2018/0236621 | A1 * | 8/2018 | Arthur | B23Q 11/0071 |
| 2019/0291254 | A1 * | 9/2019 | Panks | B25D 17/02 |

FOREIGN PATENT DOCUMENTS

| | | | | |
|---|---|---|---|---|
| CN | 203160296 | U | 8/2013 | |
| CN | 105666429 | A | 6/2016 | |
| CN | 107234596 | A | 10/2017 | |
| CN | 107234598 | A * | 10/2017 | B25D 17/082 |
| CN | 207027417 | U | 2/2018 | |
| CN | 207509155 | U | 6/2018 | |
| CN | 208914036 | U | 5/2019 | |
| CN | 208961939 | U | 6/2019 | |
| CN | 210968749 | U | 7/2020 | |
| GB | 2370963 | A | 7/2002 | |
| WO | WO-9319899 | A1 * | 10/1993 | B25D 17/245 |

OTHER PUBLICATIONS

Decision of Rejection for Chinese Application No. CN201910809840.5, dated Apr. 25, 2025, 11 pages including the English translation, CNIPA.

* cited by examiner

PNEUMATIC CHIPPING HAMMER

CROSS-REFERENCE TO RELATED APPLICATION

The present application claims priority to PCT Application No. PCT/CN2019/103364 filed on Aug. 29, 2019, entitled "PNEUMATIC SHOVEL", which is hereby incorporated by reference in its entirety.

TECHNICAL FIELD

The present application relates to a pneumatic impact tool, and in particular to a pneumatic chipping hammer.

BACKGROUND ART

A pneumatic chipping hammer is a handheld pneumatic impact tool. At present, pneumatic chipping hammers on the market can be divided into three types, i.e. a straight-handle pneumatic chipping hammer, a curved-handle pneumatic chipping hammer and an annular-handle pneumatic chipping hammer, based on types of handles. The main structure of the pneumatic chipping hammer is generally composed of a handle part, a main power part and a chisel part, wherein the handle part and the main power part form a main machine. Now most of the pneumatic chipping hammer main machines are universal and are provided with different chisels based on different usage occasions. There is no doubt that the main power part of the pneumatic chipping hammer is a critical part. At present, in order to ensure stability of the main power part, most manufacturers make large parts with complex structures, which invisibly increases the weight of products and also increases the labor intensity of operators. Meanwhile, a fixed handle is very inconvenient for people in a narrow space and with different heights. It is inevitable to encounter the need to pry during use, while the existing pneumatic chipping hammer has no strong fulcrum.

SUMMARY OF THE INVENTION

In view of the above-mentioned drawbacks of the prior art, the present application provides a pneumatic chipping hammer which can achieve different purposes and be suitable for people with different heights.

To achieve the above object, the present application discloses a pneumatic chipping hammer, which comprises:

- a handle part, the handle part being a hollow member;
- a main power part, one end of the main power part being connected to the handle part, and principal axes of the handle part and the main power part forming a certain angle; and
- a chisel part, the chisel part being detachably connected to the other end of the main power part, wherein the direction of mounting the chisel part on the main power part can be changed.

Optionally, the angle between the principal axes of the handle part and the main power part is 5-85 degrees.

Optionally, the handle part is provided with a first end and a second end which is opposite to the first end, the handle part is provided with an air intake member and a handle member successively from the first end to the second end, the handle member is a curved handle and the handle member is internally provided with a first air passage, and the air intake member is in communication with the first air passage via an air tube member.

Optionally, the handle part further comprises a trigger member, wherein the trigger member is provided at the first end of the handle part, the trigger member is connected to the air intake member via a hinge pin, and the trigger member is in linkage with the air tube member to control connection and disconnection of an air channel.

Optionally, the main power part comprises a main body member and an air cylinder member, wherein the main body member is internally provided with a second air passage, the air cylinder member is provided with a third end and a fourth end which is opposite to the third end, the third end of the air cylinder member is positioned in the main body member, and the air cylinder member is in communication with the second air passage.

A cavity of the air cylinder member is internally provided with an impact member, and the impact member reciprocates in the cavity of the air cylinder member.

The main body member is connected to the second end of the handle part via a connecting member, and the fourth end of the air cylinder member is connected to the chisel part via a locking member.

Optionally, the air cylinder member is an integral member.

Optionally, the connecting member is a hollow pipe, which communicates the first air passage with the second air passage.

Optionally, the locking member is provided on an outer side of the fourth end of the air cylinder member, the locking member is connected to the air cylinder member via an elastic member and a lock member, and a circular groove is provided in the locking member and located below the lock member to make room for the lock member when the chisel part is disassembled and assembled.

Optionally, the chisel part comprises a connecting end and a working end connected to the connecting end, the connecting end being provided with a clamping position matching the lock member.

Optionally, detachable wheels are provided on two sides of a middle position of the chisel part.

Compared with the prior art, the present application has the following beneficial effects:

1) According to the pneumatic chipping hammer of the present application, the mounting direction (forward and reverse mounting) of the chisel part on the main power part is changed by the locking member, and therefore the angle between the principal axes of the handle part and the main power part can be 5-85 degrees, so that a handle is inclined to further achieve different purposes and be suitable for people with different heights.
2) According to the pneumatic chipping hammer of the present application, the air cylinder member of the main power part is designed to be an integral member, thereby having higher accuracy compared with a conventional air cylinder composed of two components and having higher structural strength at the same wall thickness, and achieves a simple structure and light weight and saves on labor intensity of users.
3) According to the pneumatic chipping hammer of the present application, detachable wheels are provided on two sides of the middle position of the chisel part, so that operation and carrying are easier and more convenient, and effective fulcrums are further provided for prying.

The concept, specific structure, and resulting technical effect of the present application are further described below in conjunction with the drawings to fully understand the object, features and effects of the present application.

Figure 1:
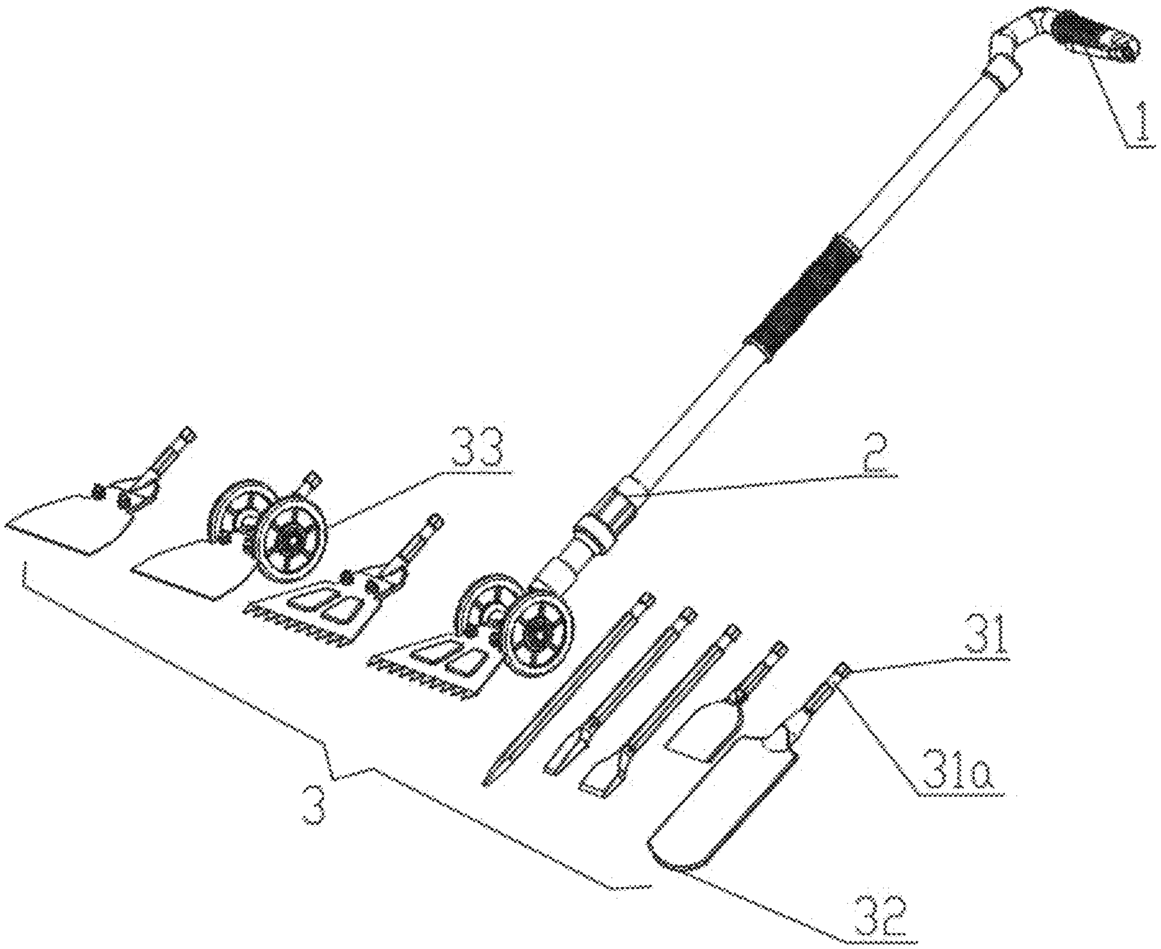
FIG. 1 is a schematic view of the three-dimensional appearance of a pneumatic chipping hammer according to a first embodiment of the present application.

In the figures: 1. Handle part, 2. Main power part, 3. Chisel part, 11. Handle member, 12. Air intake member, 13. Trigger member, 14. First end, 15. Second end, 16. First air passage, 21. Main body member, 22. Air cylinder member, 23. Impact member, 24. Locking member, **24*a*. Circular groove, 25. Connecting member, 31. Connecting end, 31*a*. Clamping position, 32. Working end, 33. Wheel, 121. Air tube member, 131. Hinge pin, 211. Second air passage, 221. Third end, 222. Fourth end, 241. Elastic member, 242**. Lock member.

DETAILED DESCRIPTION OF EMBODIMENTS

Preferred embodiments of the present application are described below with reference to the drawings of the description to make the technical contents clearer and easier to understand. The present application can be embodied in various forms of embodiments, and the scope of protection of the present application is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the present application does not define the size and thickness of each assembly. In order to make the illustration clearer, the thickness of the component in some places of the figures is appropriately exaggerated.

In the description of the present application, it should be noted that orientations or position relationships indicated by terms such as "center", "upper", "lower", "left", "right", "vertical", "horizontal", "inside" and "outside" are based on orientations or position relationships shown in the drawings, which is only for convenience of describing the present invention and simplifying the description, rather than indicates or implies that devices or elements referred to must have a specific orientation or be constructed and operated in the specific orientation, and therefore cannot be construed as limiting the present invention.

In the description of the present application, it should be noted that unless otherwise explicitly specified and defined, terms "mounting", "connecting" and "connection" should be understood in a broad sense, for example, they can be a fixed connection, a detachable connection, or an integrated connection; can be a mechanical connection and can also be an electrical connection; and can be a direct connection and can also be an indirect connection through an intermediate medium, and can be communication between interiors of two elements.

For a person of ordinary skill in the art, the specific meaning of the above terms in the present invention could be understood according to specific circumstances.

Embodiment I

This embodiment discloses a pneumatic chipping hammer, the structure of which is shown in FIG. 1. The pneumatic chipping hammer comprises a handle part 1, the handle part 1 being a hollow member; a main power part 2, one end of the main power part 2 being connected to the handle part 1, and principal axes of the handle part 1 and the main power part 2 forming a certain angle; and a chisel part 3, the chisel part 3 being detachably connected to the other end of the main power part 2, wherein the direction of mounting the chisel part 3 on the main power part 2 can be changed.

It should be noted that, according to the present application, the mounting direction (forward and reverse mounting) of the chisel part 3 on the main power part 2 is changed, and therefore the angle between the principal axes of the handle part 1 and the main power part 2 can be at certain degrees, for example 5-85 degrees, such as 5, 10, 20, 30, 40, 45, 50, 55, 60, 65, 70, 75, 80 and 85 degrees, so that a handle is inclined to further achieve different purposes and be suitable for people with different heights.

Figure 2:
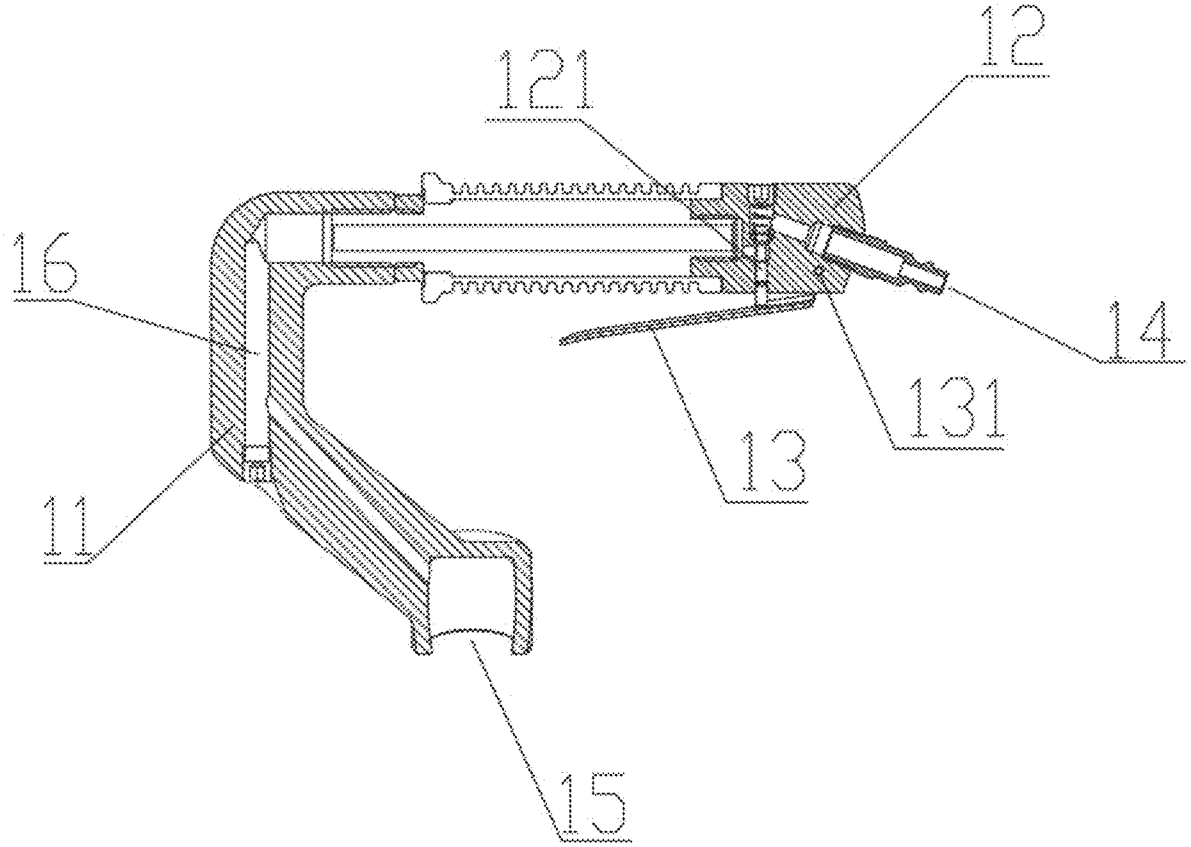
FIG. 2 is a schematic cross-sectional view of a handle part of the pneumatic chipping hammer according to the first embodiment of the present application.

As shown in FIG. 2, the handle part 1 is provided with a first end 14 and an opposite second end 15, the handle part 1 is provided with an air intake member 12 and a handle member 11 successively from the first end 14 to the second end 15, the handle member 11 is a curved handle and the handle member 11 is internally provided with a first air passage 16, and the air intake member 12 is in communication with the first air passage 16 via an air tube member 121.

The handle part 1 further comprises a trigger member 13, wherein the trigger member 13 is provided at the first end 14 of the handle part 1, the trigger member 13 is connected to the air intake member 12 via a hinge pin 131, and the trigger member 13 is in linkage with the air tube member 121 to control connection and disconnection of an air channel.

It should be noted that, the handle part 1 is connected to an initial state of air, after compressed air is accessed, the trigger member 13 is pulled, the compressed air enters the main power part 2 through a gap of the air tube member 121 along the first air passage 16 and the connecting member 25.

Figure 3:
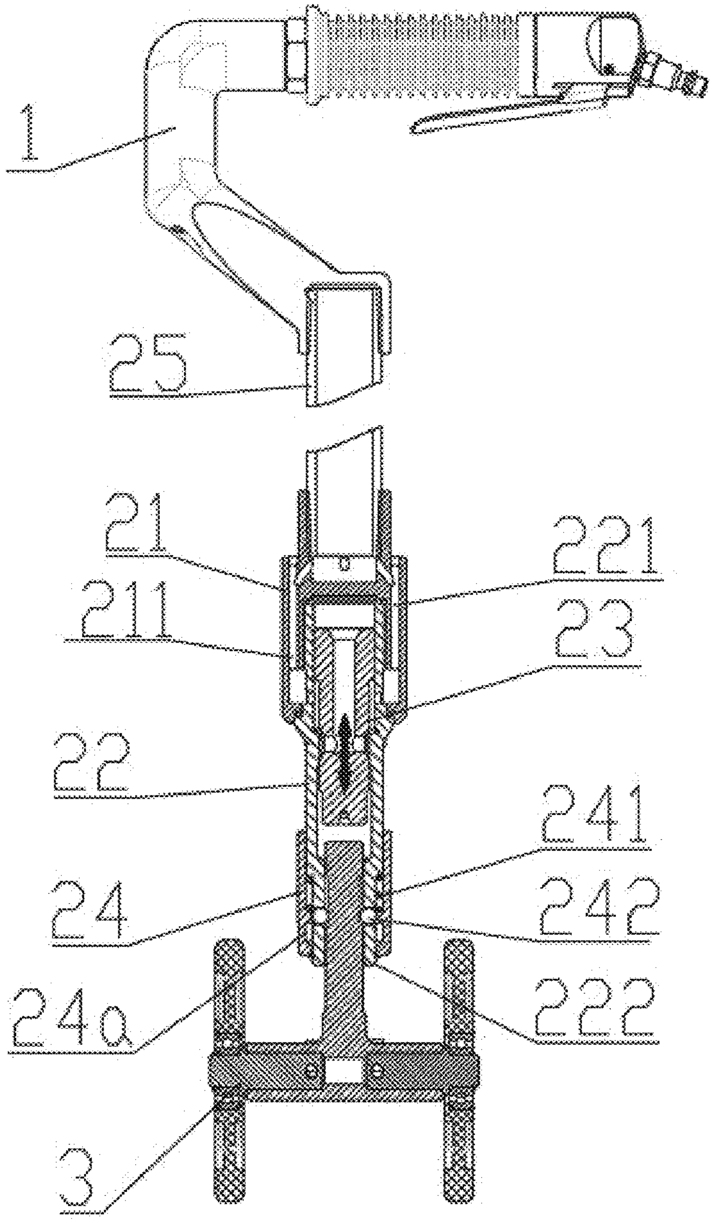
FIG. 3 is an overall schematic cross-sectional view of the pneumatic chipping hammer according to the first embodiment of the present application.

As shown in FIG. 3, the main power part 2 comprises a main body member 21 and an air cylinder member 22, wherein the main body member 21 is internally provided with a second air passage 211, the air cylinder member 22 is provided with a third end 221 and an opposite fourth end 222, the third end 221 of the air cylinder member 22 is positioned in the main body member 21, and the air cylinder member 22 is in communication with the second air passage 211.

A cavity of the air cylinder member 22 is internally provided with an impact member 23, and the impact member 23 reciprocates in the cavity of the air cylinder member 22.

The main body member 21 is connected to the second end 15 of the handle part 1 via a connecting member 25, and the fourth end 222 of the air cylinder member 22 is connected to the chisel part 3 via a locking member 24.

It should be noted that, the locking member 24 can change the mounting direction of the chisel part 3 on the main power part 2.

The air cylinder member 22 is an integral member, thereby having higher accuracy compared with a conventional air cylinder composed of two components and having higher structural strength at the same wall thickness, and achieves a simple structure and light weight and saves on labor intensity of users.

The connecting member 25 is a hollow pipe, which provides a passage for the compressed air and communicates the first air passage 16 with the second air passage 211.

It should be noted that, after the compressed air accessed to the handle part 1 enters the second air passage 211 of the main body member 21 through the connecting member 25, the main power part 2 cannot be started immediately. At this time, a thrust from the chisel part 3 is required to further push the impact member 23 to reciprocate in an inner cavity of the air cylinder member 22, wherein the impact member 23 can be a piston and can also be other components or members which can achieve the function or have the same action and function as the piston.

Figure 4:
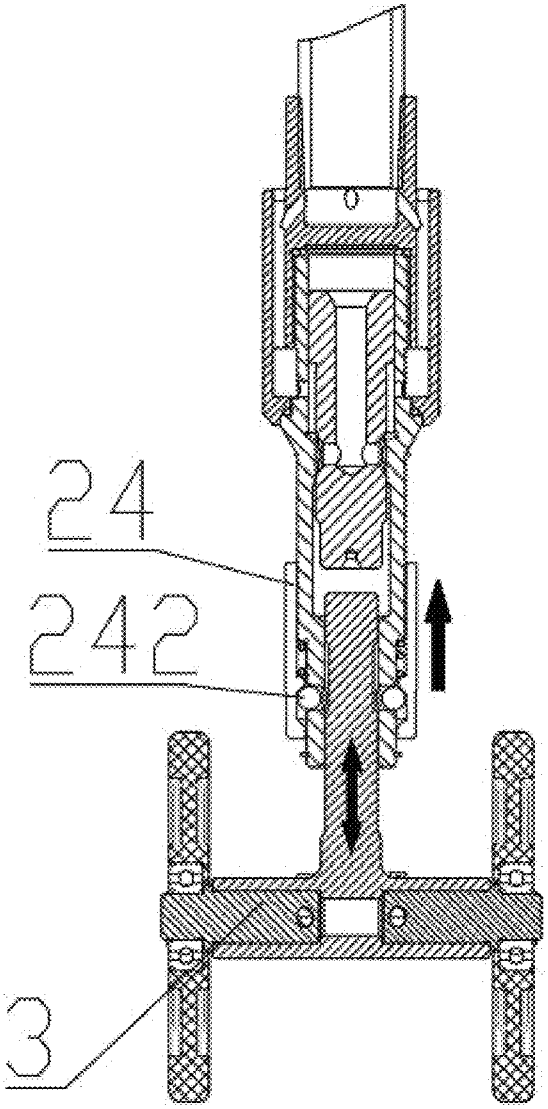
FIG. 4 is a schematic view of replacing a chisel of the pneumatic chipping hammer according to the first embodiment of the present application.

As shown in FIG. 4, the locking member 24 is provided on an outer side of the fourth end 222 of the air cylinder member 22, the locking member 24 is connected to the air cylinder member 22 via an elastic member 241 and a lock member 242, and a circular groove **24*a* is provided on an inner side of the locking member 24 and located below the lock member 242 to make room for the lock member 242** when the chisel part is disassembled and assembled.

It should be noted that, the locking member 24 is a hollow cylinder and the circular groove **24*a* is provided on the inner side of the locking member 24 and located below the lock member 242, and therefore the mounting direction of the chisel part 3 on the main power part 2 can be changed; and the handle member 1 is a curved handle, so that the principal axes of the handle part 1 and the main power part 2** form a certain degree, thereby solving the problem that a fixed handle is very inconvenient for people in a narrow space and with different heights.

It should be noted that, the elastic member 241 can be a spring and can also be other components which can achieve an elastic function or have the same action or function as the spring; and the lock member 242 can be a metal ball, for example, a steel ball, an aluminum ball or an alloy ball, and can also be other components which can achieve a lock function or have the same action or function as the steel ball.

Figure 5:
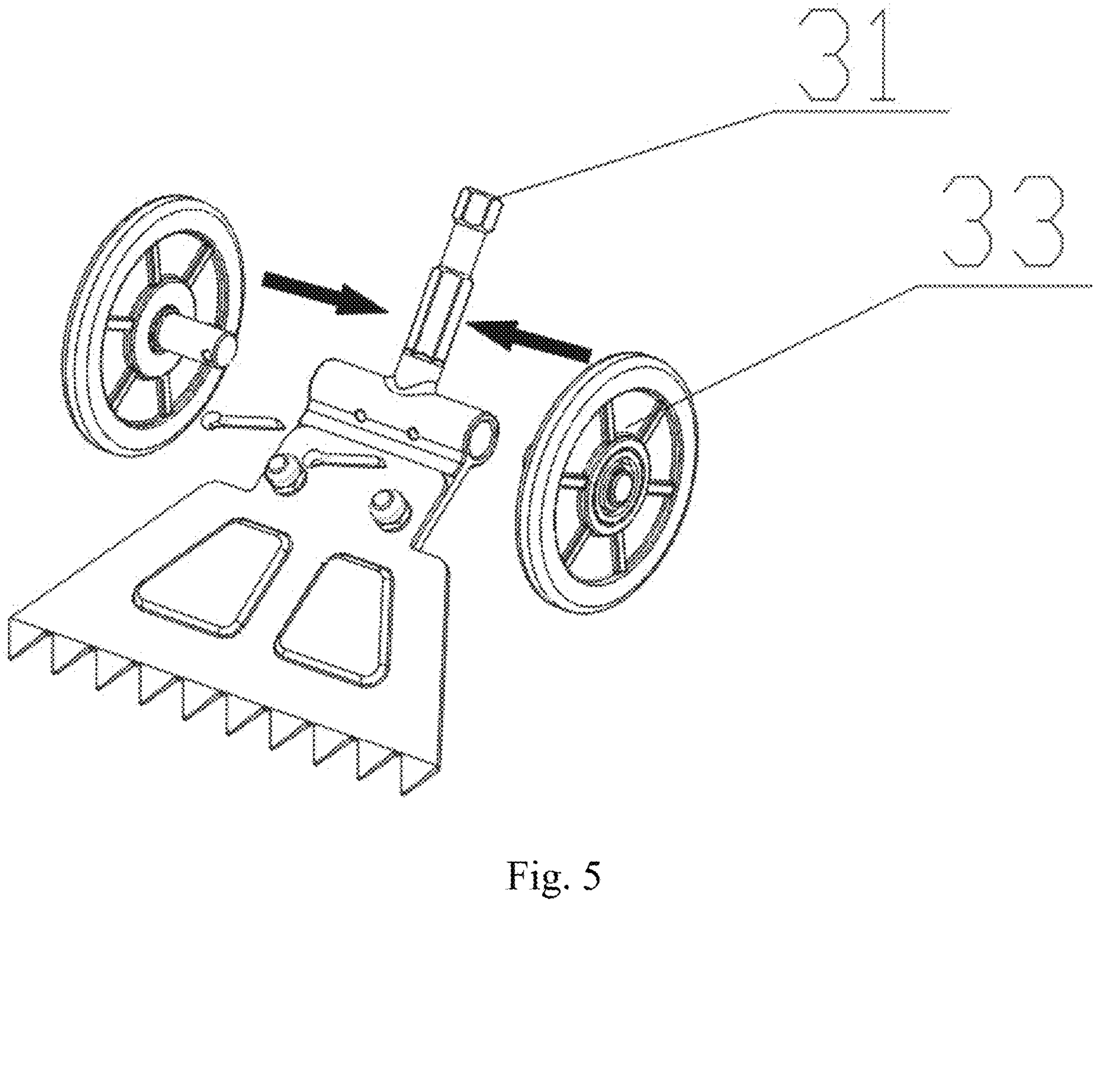
FIG. 5 is a schematic view of disassembling and assembling wheels of a wheeled chisel of the pneumatic chipping hammer according to the first embodiment of the present application.

As shown in FIG. 1 and FIG. 5, the chisel part 3 comprises a connecting end 31 and a working end 32 connected to the connecting end 31, the connecting end 31 being provided with a clamping position **31*a* matching the lock member 242**.

It should be noted that, according to the present application, the connecting end 31 is provided on the chisel part 3 and the connecting end 31 is provided with the clamping position **31*a* matching the lock member 242, and therefore the chisel part 3 can be detachably connected to the main power part 2**.

When the chisel needs to be replaced, the locking member 24 is pulled upwards, at this time, the chisel is mounted upwards or is removed downwards, and the lock member 242 moves into the circular groove **24*a* on the inner side of the locking member 24; and when the locking member 24 is released, the locking member 24 resets under an elastic action of the elastic member 241, which will squeeze the lock member 242 to move to the middle and gets stuck in the clamping position of the connecting end 31** of the chisel, so that the chisel does not fall off.

As shown in FIG. 5, detachable wheels 33 are provided on two sides of a middle position of the chisel part 3, so that operation and carrying are easier and more convenient, and effective fulcrums are also provided for prying.

It should be noted that, according to the present application, through providing the detachable wheels 33 on the two sides of the middle position of the chisel part 3, the following advantages are achieved: 1) for example, when it is difficult to push or lift an adhesive board on a roof and other places that needs to be shoveled, users can easily push through the work by means of the wheels; and 2) the wheels can further act as effective fulcrums for nail nipping when the pneumatic chipping hammer shovels nails fixing the adhesive board.

Figure 6:
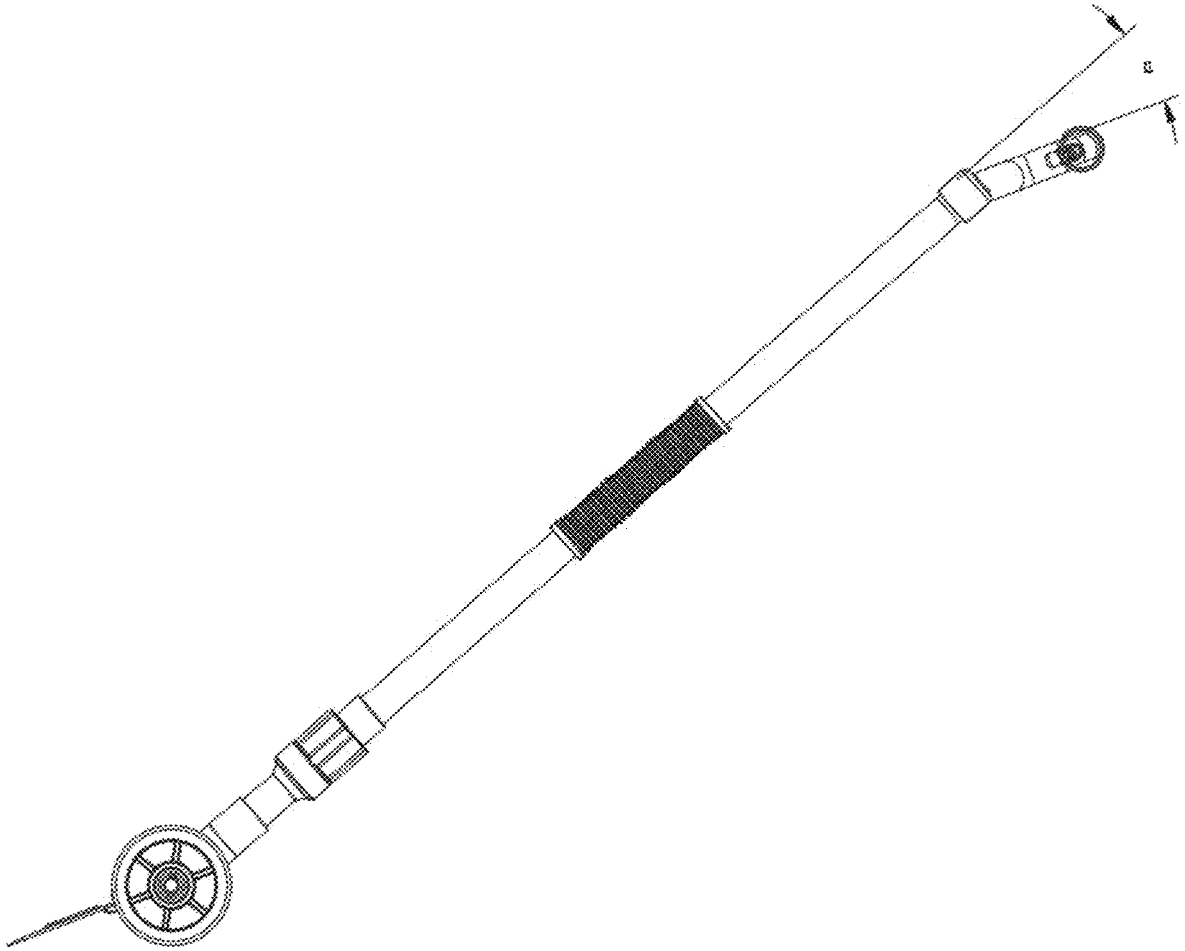
FIG. 6 is a schematic view of a working position of forward mounting of the chisel part of the pneumatic chipping hammer according to the first embodiment of the present application.
Figure 7:
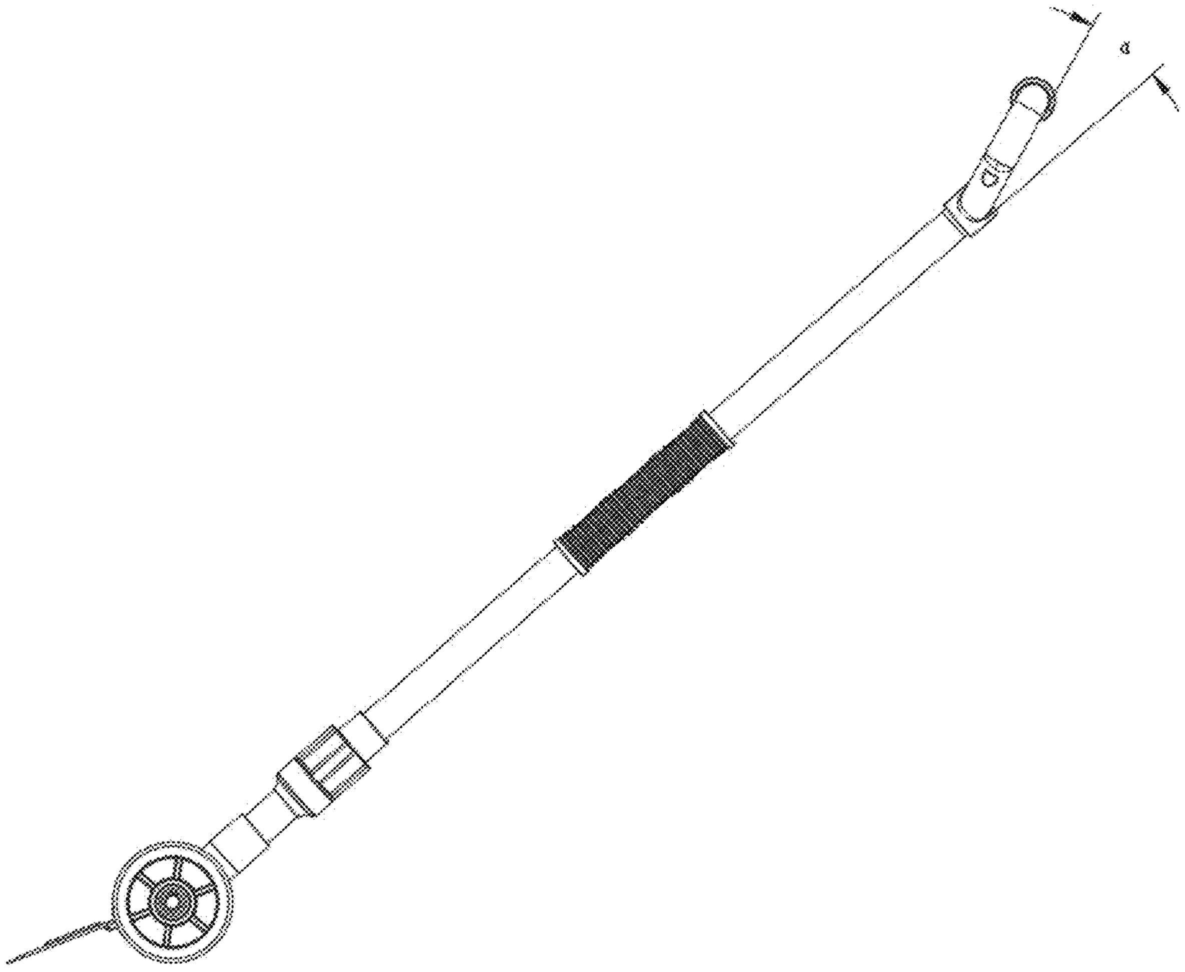
FIG. 7 is a schematic view of a working position of reverse mounting of the chisel part of the pneumatic chipping hammer according to the first embodiment of the present application.

As shown in FIG. 6 and FIG. 7, quick release and direction changing between the chisel part 3 and the main power part 2 are achieved by the clamping position, so that the principal axes of the handle part 1 and the main power part 2 form a certain degree, wherein a suitable angle is 5-85 degrees, such as 5, 10, 20, 30, 40, 45, 50, 55, 60, 65, 70, 75, 80 and 85 degrees, thereby solving the problem that a fixed handle is very inconvenient for people in a narrow space and with different heights.

The specific preferred embodiments of the present application are described in detail as above. It should be appreciated that a person of ordinary skill in the art would be able to make modifications and variations in accordance with the concept of the present application without involving any inventive effort. Therefore, any technical solution that can be obtained by a person skilled in the art by means of logical analysis, reasoning or limited trials on the basis of the prior art and according to the concept of the present application should be included within the scope of protection of the claims.

The invention claimed is:

1. A pneumatic chipping hammer, comprising:

a handle part, the handle part being a hollow member;

a main power part, one end of the main power part being connected to the handle part, and principal axes of the handle part and the main power part forming a certain angle between them; and a chisel part, the chisel part being detachably connected to another end of the main power part, wherein a direction of mounting of the chisel part on the main power part can be changed; wherein the handle part is provided with a first end and a second end which is opposite to the first end; wherein the main power part comprises a locking member and an air cylinder member; wherein the air cylinder member is provided with a third end and a fourth end which is opposite to the third end; and wherein the locking member is provided on an outer side of the fourth end of the air cylinder member, the locking member is connected to the air cylinder member via an elastic member and a lock member, and a circular groove is provided in the locking member and located below the lock member to make room for the lock member when the chisel part is disassembled and assembled.

2. The pneumatic chipping hammer of claim 1, wherein the angle between the principal axes of the handle part and the main power part is 5-85 degrees.

3. The pneumatic chipping hammer of claim 1, wherein the handle part is provided with an air intake member and a handle member successively from the first end to the second end, the handle member is a curved handle and the handle member is internally provided with a first air passage, and the air intake member is in communication with the first air passage via an air tube member.

4. The pneumatic chipping hammer of claim 3, wherein the handle part further comprises a trigger member, wherein the trigger member is provided at the first end, the trigger member is connected to the air intake member via a hinge pin, and the trigger member is in linkage with the air tube member to control connection and disconnection of an air channel.

5. The pneumatic chipping hammer of claim 4, wherein the main power part further comprises a main body member which is internally provided with a second air passage; wherein the third end of the air cylinder member is positioned in the main body member, and the air cylinder member is in communication with the second air passage;

wherein a cavity of the air cylinder member is internally provided with an impact member, and the impact member reciprocates in the cavity of the air cylinder member; and wherein the main body member is connected to the second end of the handle part via a connecting member, and the fourth end of the air cylinder member is connected to the chisel part via the locking member.

6. The pneumatic chipping hammer of claim 5, wherein the air cylinder member is an integral member.

7. The pneumatic chipping hammer of claim 5, wherein the connecting member is a hollow pipe which communicates the first air passage with the second air passage.

8. The pneumatic chipping hammer of claim 5, wherein the chisel part comprises a connecting end and a working end connected to the connecting end, the connecting end being provided with a clamping portion matching the lock member.

9. The pneumatic chipping hammer of claim 1, wherein detachable wheels are provided on two sides of a middle portion of the chisel part.

10. The pneumatic chipping hammer of claim 2, wherein the handle part is provided with an air intake member and a handle member successively from the first end to the second end, the handle member is a curved handle and the handle member is internally provided with a first air passage, and the air intake member is in communication with the first air passage via an air tube member.

11. The pneumatic chipping hammer of claim 10, wherein the handle part further comprises a trigger member, wherein the trigger member is provided at the first end, the trigger member is connected to the air intake member via a hinge pin, and the trigger member is in linkage with the air tube member to control connection and disconnection of an air channel.

12. The pneumatic chipping hammer of claim 11, wherein the main power part further comprises a main body member which is internally provided with a second air passage;

wherein the third end of the air cylinder member is positioned in the main body member, and the air cylinder member is in communication with the second air passage;

wherein a cavity of the air cylinder member is internally provided with an impact member, and the impact member reciprocates in the cavity of the air cylinder member; and wherein the main body member is connected to the second end of the handle part via a connecting member, and the fourth end of the air cylinder member is connected to the chisel part via the locking member.

13. The pneumatic chipping hammer of claim 12, wherein the air cylinder member is an integral member.

14. The pneumatic chipping hammer of claim 12, wherein the connecting member is a hollow pipe which communicates the first air passage with the second air passage.

15. The pneumatic chipping hammer of claim 12, wherein the chisel part comprises a connecting end and a working end connected to the connecting end, the connecting end being provided with a clamping portion matching the lock member.

16. The pneumatic chipping hammer of claim 2, wherein detachable wheels are provided on two sides of a middle portion of the chisel part.

* * * * *